US012780324B2

(12) United States Patent
De Santis

(10) Patent No.: US 12,780,324 B2
(45) Date of Patent: Nov. 3, 2026

(54) CROSS-MEMBER FOR SUPPORTING A DASHBOARD OF A MOTOR-VEHICLE

(71) Applicant: STELLANTIS EUROPE S.P.A., Turin (IT)

(72) Inventor: Antonio De Santis, Turin (IT)

(73) Assignee: Stellantis Europe S.p.A., Turin (IT)

(*) Notice: Subject to any disclaimer, the term of this patent is extended or adjusted under 35 U.S.C. 154(b) by 253 days.

(21) Appl. No.: 18/711,381

(22) PCT Filed: Nov. 18, 2022

(86) PCT No.: PCT/IB2022/061132
§ 371 (c)(1),
(2) Date: May 17, 2024

(87) PCT Pub. No.: WO2023/089549
PCT Pub. Date: May 25, 2023

(65) Prior Publication Data

US 2025/0171087 A1 May 29, 2025

(30) Foreign Application Priority Data

Nov. 22, 2021 (IT) ........................ 102021000029435

(51) Int. Cl.
*B62D 25/14* (2006.01)
*B60K 1/04* (2019.01)

(52) U.S. Cl.
CPC .... *B62D 25/145* (2013.01); *B60K 2001/0411* (2013.01); *B60K 2001/0461* (2013.01)

(58) Field of Classification Search
CPC .............. B60K 1/04; B60K 2001/0405; B60K 2001/0411; B60K 2001/0438; B62D 25/14
USPC ............................ 296/193.02, 78.1; 180/210
See application file for complete search history.

(56) References Cited

U.S. PATENT DOCUMENTS

| | | | | |
|---|---|---|---|---|
| 5,222,752 A * | 6/1993 | Hewitt | B62J 43/30 | 280/288.4 |
| 5,549,344 A * | 8/1996 | Nishijima | B60K 37/10 | 296/70 |
| 6,572,178 B2 * | 6/2003 | Hartel | F16F 15/005 | 296/70 |
| 6,631,775 B1 * | 10/2003 | Chaney | B60L 53/80 | 280/783 |
| 7,172,241 B2 * | 2/2007 | Fischer | B62D 25/145 | 296/1.03 |
| 8,256,553 B2 * | 9/2012 | De Paschoal | B60L 53/80 | 180/68.5 |

(Continued)

FOREIGN PATENT DOCUMENTS

| | | | |
|---|---|---|---|
| DE | 19534568 A1 | | 4/1996 |
| DE | 102016007781 | * | 12/2017 |
| GB | 1569268 | * | 6/1980 |

(Continued)

OTHER PUBLICATIONS

European Patent Office International Search Report and Written Opinion of PCT/IB2022/061132, dated Oct. 2, 2023, 10 pages.

*Primary Examiner* — Joseph D. Pape
(74) *Attorney, Agent, or Firm* — Victor Cardona, Esq; Heslin Rothenberg Farley & Mesiti P.C.

(57) ABSTRACT

A cross member for supporting a dashboard of a motor-vehicle having a battery pack mounted inside a cavity of the supporting cross member.

8 Claims, 6 Drawing Sheets

(56) References Cited

U.S. PATENT DOCUMENTS

2009/0255747 A1 * 10/2009 Kasaba .................. B62K 5/027
180/208

FOREIGN PATENT DOCUMENTS

GB 2382058 A 5/2003
JP 2006069480 A 3/2006

* cited by examiner

CROSS-MEMBER FOR SUPPORTING A DASHBOARD OF A MOTOR-VEHICLE

CROSS REFERENCE TO RELATED APPLICATIONS

This application is a national stage filing under Section 371 of International Application No. PCT/IB2022/061132, filed Nov. 18, 2022, published in English on May 25, 2023, as WO 2023/089549 A1 and which claims priority from Italian Patent Application No. 102021000029435 filed on Nov. 22, 2021, the entire disclosures of which are incorporated herein by reference.

FIELD OF THE INVENTION AND PRIOR ART

The present invention relates to a supporting cross member of a motor-vehicle dashboard.

In the automotive sector, dashboard cross member assemblies are known comprising a supporting cross member configured to be fixed on suitable brackets of the motor-vehicle body by means of fastening members which engage respective seats provided on a wall of the supporting cross member. The supporting cross member has a load-bearing function and is designed to support the steering column, the climate control module and the dashboard on which there are generally various components, such as, for example, the steering wheel, on-board instruments, buttons, indicators, warning lights, etc.

OBJECT AND SUMMARY OF THE INVENTION

The object of the invention is to use the structure of the supporting cross member of a motor-vehicle dashboard, to achieve further advantageous technical functions, in addition to the function of supporting the dashboard and the other components indicated above.

An additional object of the invention is to provide a cross member for a motor-vehicle dashboard, which can be produced simply and cheaply.

According to one or more embodiments, one or more of the above mentioned aims are achieved through a motor-vehicle dashboard cross member having the characteristics specifically set forth in the claims that follow.

In particular, the invention relates to a supporting cross member of a motor-vehicle dashboard, defining a hollow bearing element which has an axial cavity, characterized in that a battery pack is mounted within the cavity of the supporting cross member.

According to a preferred characteristic of the invention, the cross member comprises a containment body arranged to contain the battery pack, the containment body being mounted axially within the cavity of the cross member.

The embodiments also relate to a motor-vehicle dashboard comprising a supporting cross member having the characteristics indicated above.

The embodiments also relate to a method for assembling a supporting cross member of a motor-vehicle dashboard.

DETAILED DESCRIPTION OF MORE EMBODIMENTS

Further characteristics and advantages of the invention will become apparent from the description that follows with reference to the attached drawings, provided purely by way of non-limiting example, wherein.

In the following description various specific details are illustrated aimed at a thorough understanding of examples of one or more embodiments. The embodiments can be implemented without one or more of the specific details, or with other methods, components, materials, etc. In other cases, known structures, materials, or operations are not shown or described in detail to avoid obscuring various aspects of the embodiments. The reference to “an embodiment” in the context of this description indicates that a particular configuration, structure or characteristic described in relation to the embodiment is included in at least one embodiment. Therefore, phrases such as “in an embodiment”, possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not therefore delimit the field of protection or the scope of the embodiments.

Figure 1:
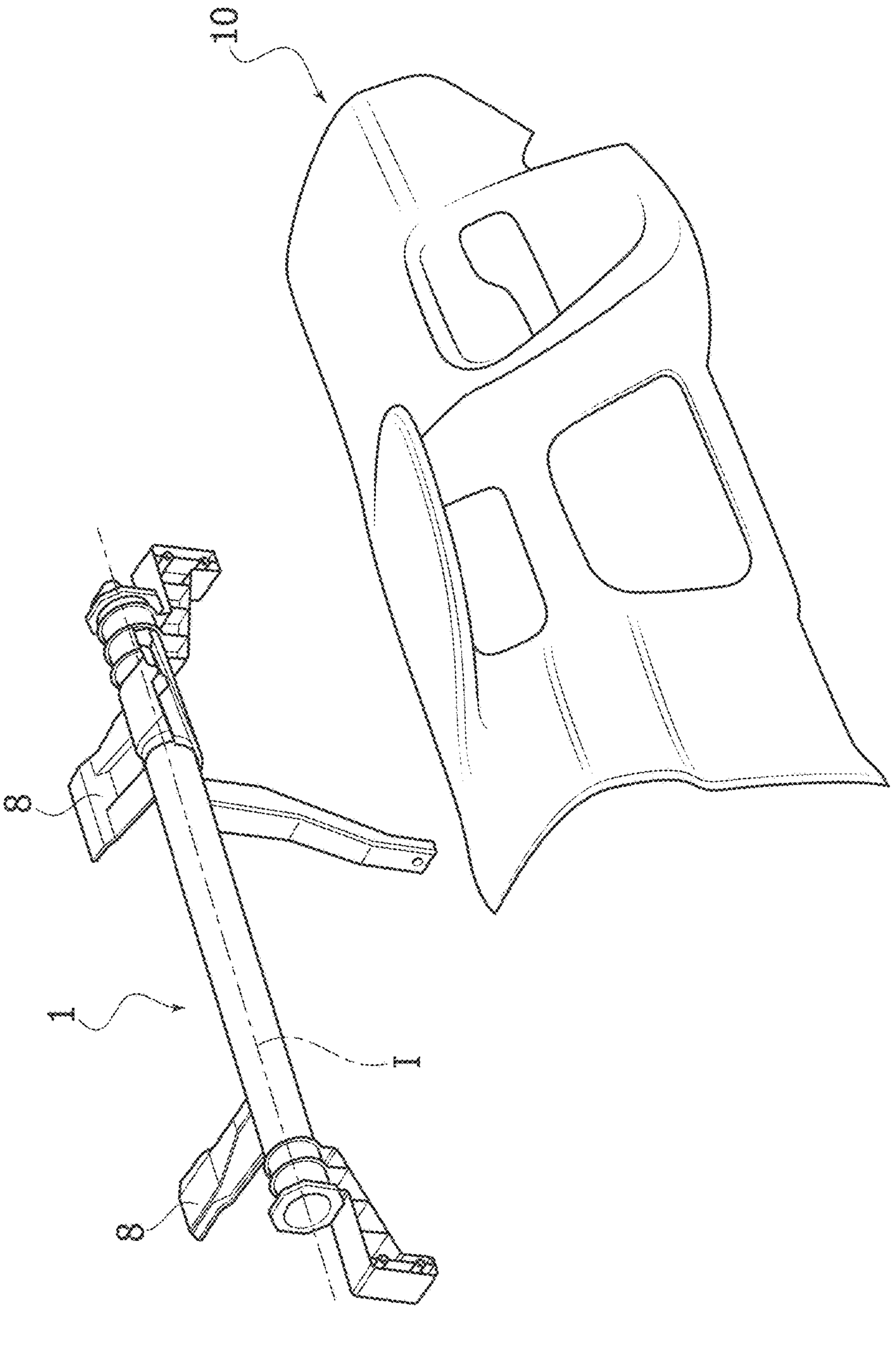
FIG. 1 is a schematic exploded perspective view of a motor-vehicle dashboard.

With reference to FIG. 1, numeral 10 generally indicates a dashboard of a motor-vehicle comprising a supporting cross member 1 arranged to support the dashboard 10 and all the components associated therewith. As is known, the dashboard 10 is provided for arranging various components, such as for example finishing panels, complete acoustic insulation panels, the instrument panel, push-button panels, adjustment cursors, air vents, airbags, the radio/sat nav system, etc.

Figure 2:
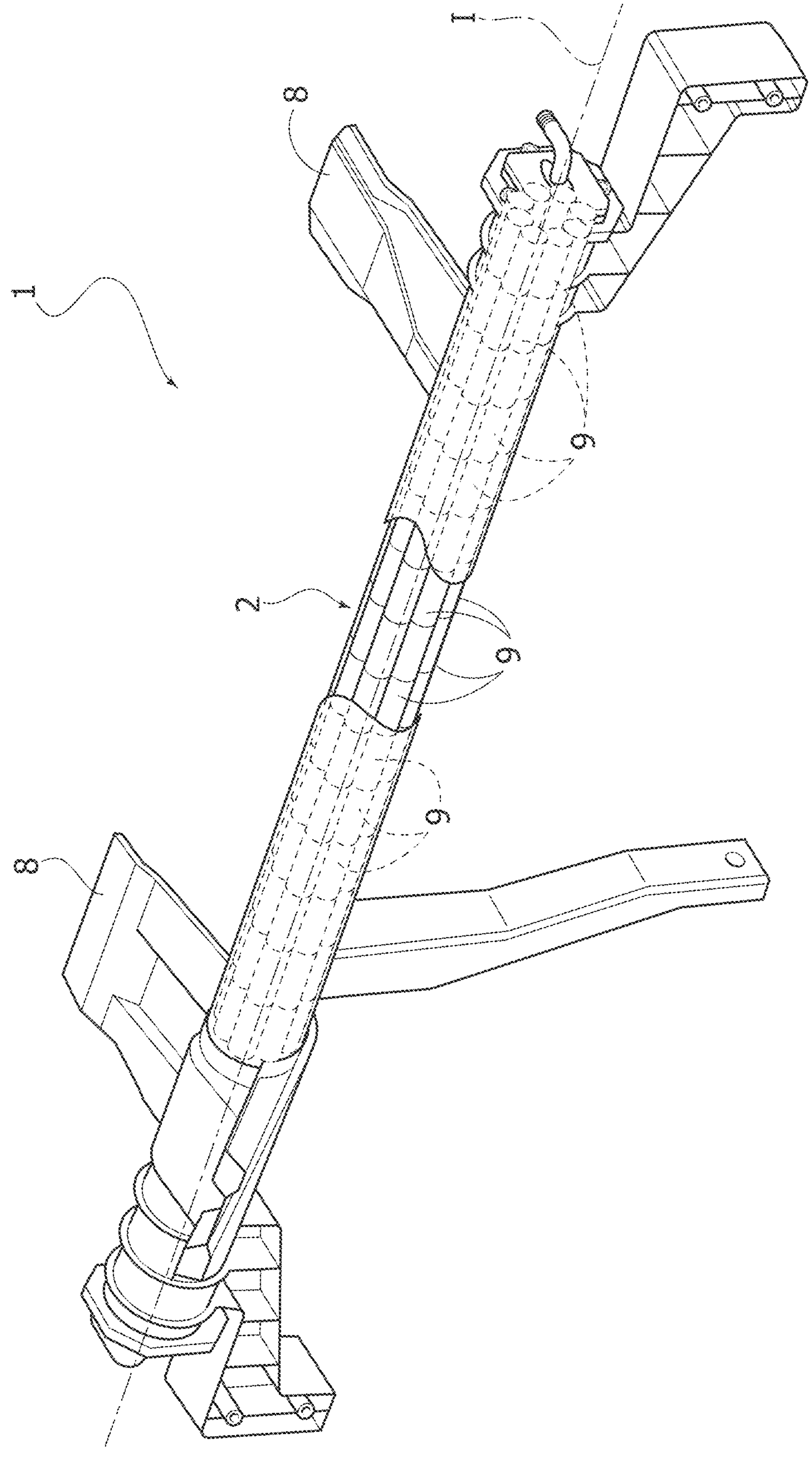
FIG. 2 is a schematic perspective view of a motor-vehicle dashboard cross member, according to a preferred embodiment of the invention.

According to the perspective view of FIG. 2, the supporting cross member 1 is a hollow element of elongated shape, for example with a circular cross-section, fixed to the body or to the chassis of the motor-vehicle transversely with respect to the longitudinal axis of the vehicle on which it is mounted. For example, as is known, the cross member 1 is able to extend from the right side to the left side of the motor-vehicle passenger compartment, along a main horizontal axis I.

In the embodiment illustrated in FIGS. 1,2, the cross member 1 comprises a tubular main body with a circular cross-section, with which a plurality of brackets 8 are associated, useful for fixing the cross member 1 to the vehicle body, or for mounting some components present in the passenger compartment on the cross member 1.

According to the present invention, a battery pack 2 is mounted inside the cavity 3 of the cross member 1. Purely by way of non-limiting example, the cavity 3 of the cross member 1 is used as a containment body for a pack of rechargeable batteries 2 comprising various battery cells/ modules 9 for powering an electric or hybrid propulsion system of the motor vehicle (or other systems mounted on board the motor-vehicle).

The battery pack 2 inside the cross member 1 may be of different types, shapes and voltages-depending on the vehicle on which they are installed-such as, for example, a lithium ion rechargeable battery, nickel-cadmium batteries, etc.

In a possible application of the invention, the battery pack 2 comprises several tens of battery cells/modules 9 arranged side-by-side, creating an additional weight of about 12 kg with respect to the structure of the supporting cross member 1. Also for this reason, the supporting cross member 1 is preferably made of a light and resistant material, such as for example a light aluminum alloy.

According to a preferred embodiment of the invention illustrated in FIGS. 3A-6, the cross member 1 comprises a containment body 4 inside it designed to contain the battery modules 9 inside it. The containment body 4 is made in such a way as to be easily housed inside the cavity 3 of the supporting cross member 1, with a "cartridge" type configuration containing the batteries 9.

In one or more embodiments, the cross member 1 has a tubular structure, within which an elongated cylindrically-shaped containment body 4 is arranged, so that the cross member 1 and the containment body 4 are coaxial. Of course, the shape of the containment body 4 varies according to the shape of the supporting cross member 1, to allow it to be housed inside it.

Figure 3A:
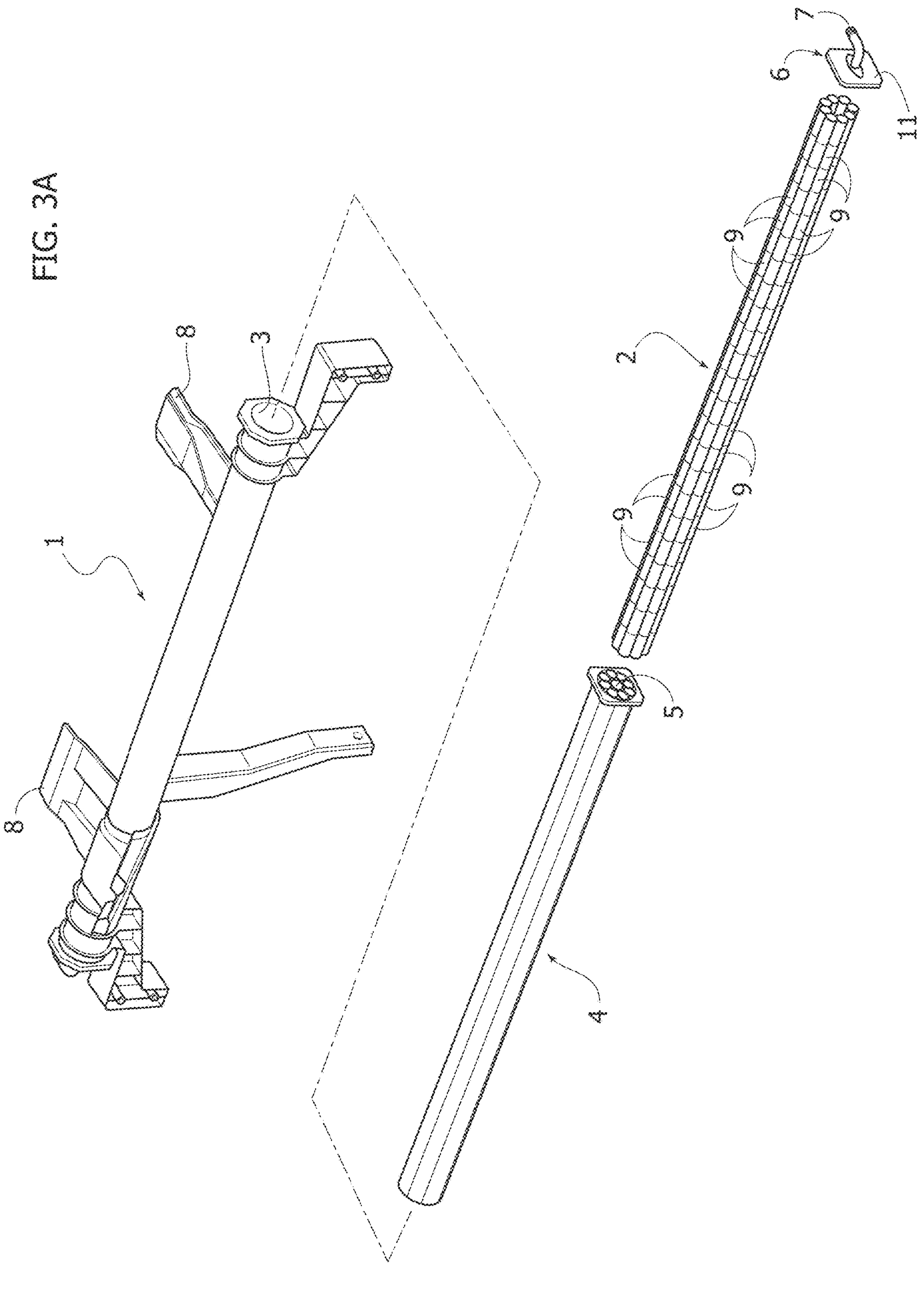
FIGS. 3A, 3B are exploded perspective views illustrating some assembly steps of the cross member illustrated in the previous figures.
Figure 3B:
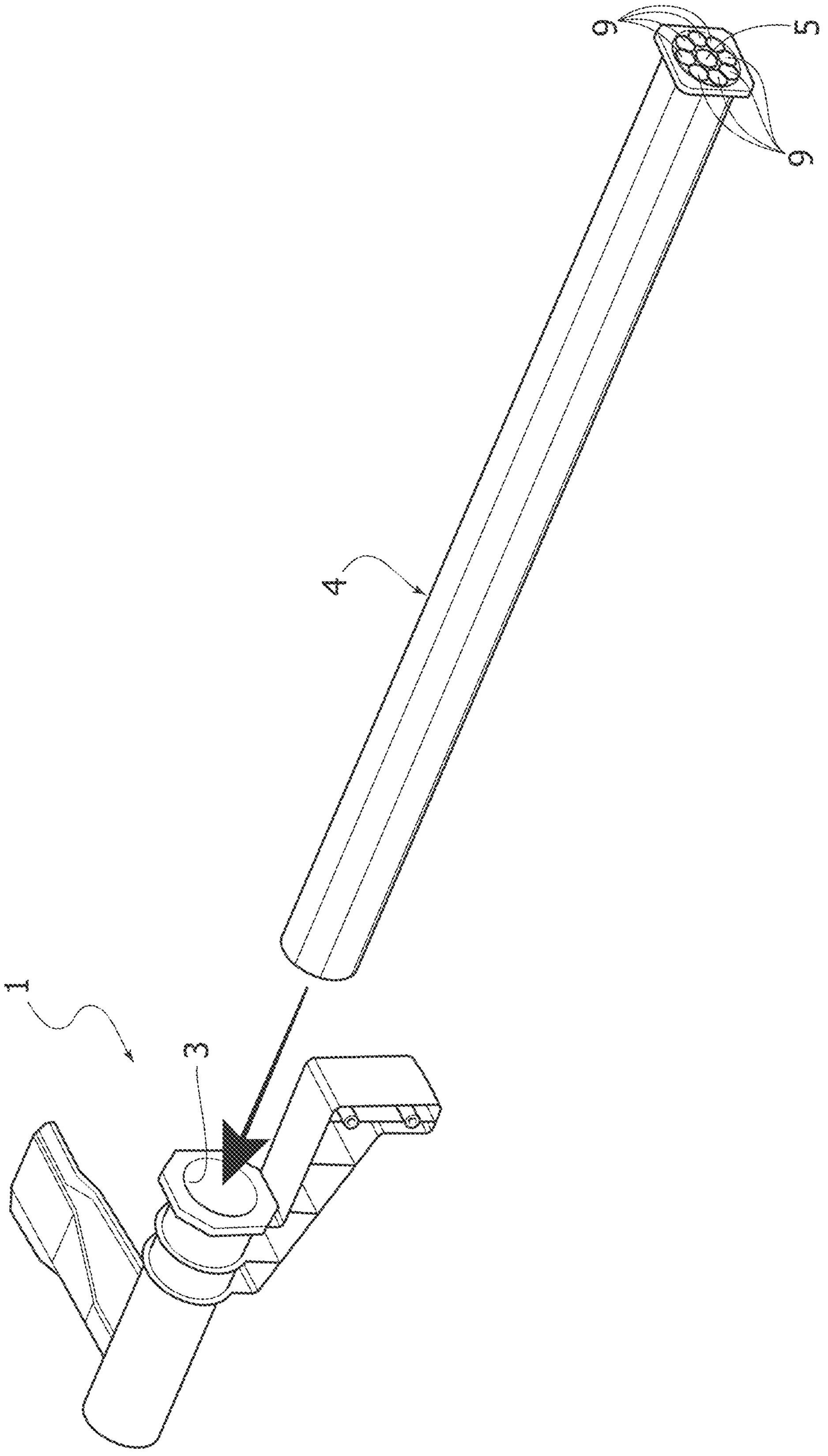

With reference to FIG. 3*a*, the battery pack 2 is arranged inside a containment body 4, which is in turn inserted inside the cavity 3 of the supporting cross member 1 along an axial direction.

In accordance with this embodiment, it is envisaged that the insertion of the battery pack 2 inside the containment body 4 is only necessary during the assembly step of the motor-vehicle itself, after having charged the batteries 9, or in concurrence of scheduled maintenance operations. The arrangement of the containment element 4 of the rechargeable batteries embodies a "cartridge" type configuration containing the batteries 9.

In accordance with a further embodiment, the battery pack 2 is made in a shape suitable for being inserted axially within the cavity of the dashboard cross member, without the aid of a containment body interposed between the wall of the cross member 1 and the battery pack 2. In one or more embodiments, the battery pack 2 has a tubular structure suitable for insertion into the cavity 3 of the cross member 1.

According to an additional characteristic of the invention, the containment body 4 comprises a central axial channel 5 arranged to allow the passage of an air-flow to cool the battery pack 2 arranged inside the containment body 4, radially around the central axial channel 5. The air-flow that passes within the central axial channel 5 is generated by the climate control system of the vehicle, and is made to flow continuously through ducting elements associated with the cross member 1. More generally, the battery pack 2 is mounted within the cross member so as to receive a cooling flow passing through at least one opening.

Figure 4A:
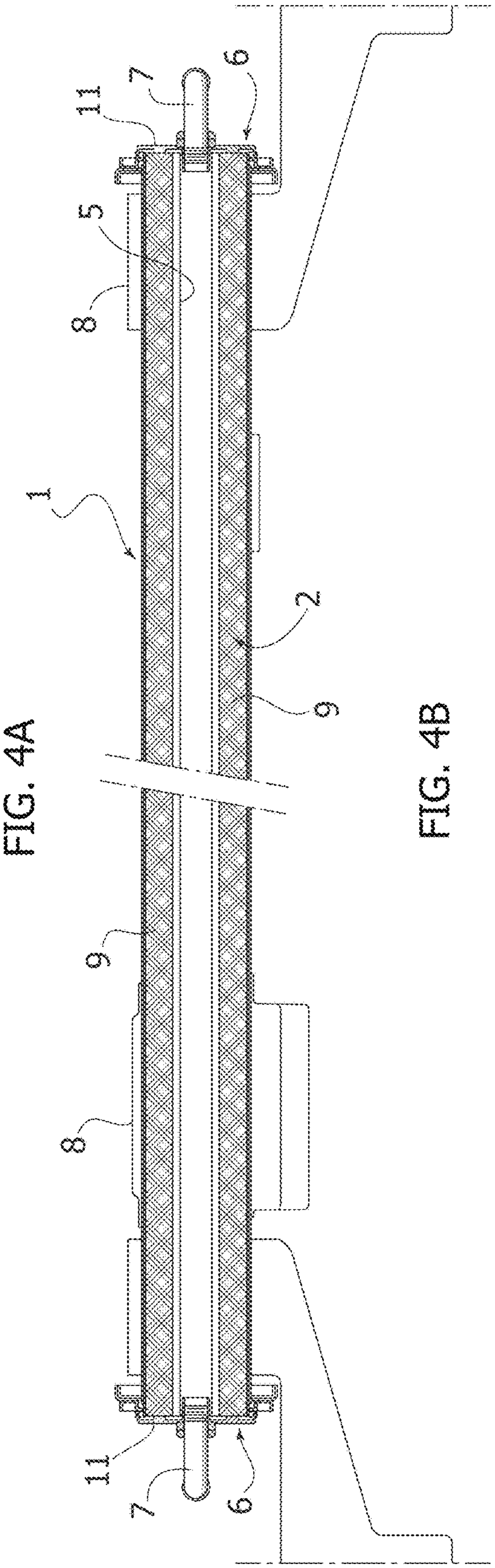
FIG. 4A is a cross-sectional view along the line A-A of FIG. 2.
Figure 4B:
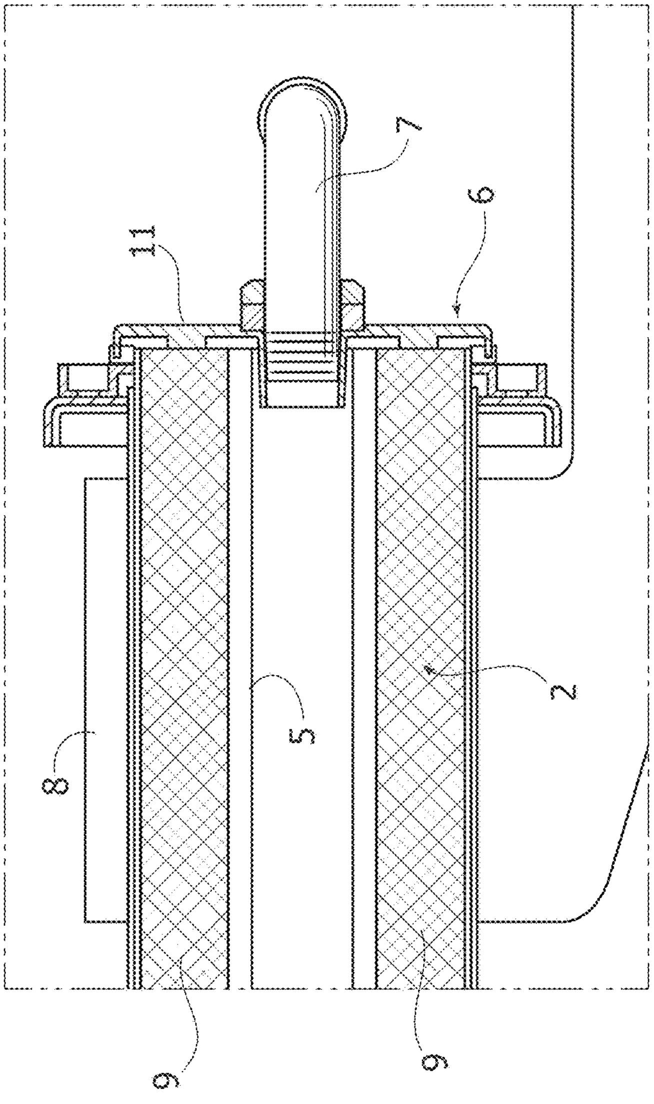
FIG. 4B is an enlarged scale view of some components illustrated in the previous Figure.
Figure 5:
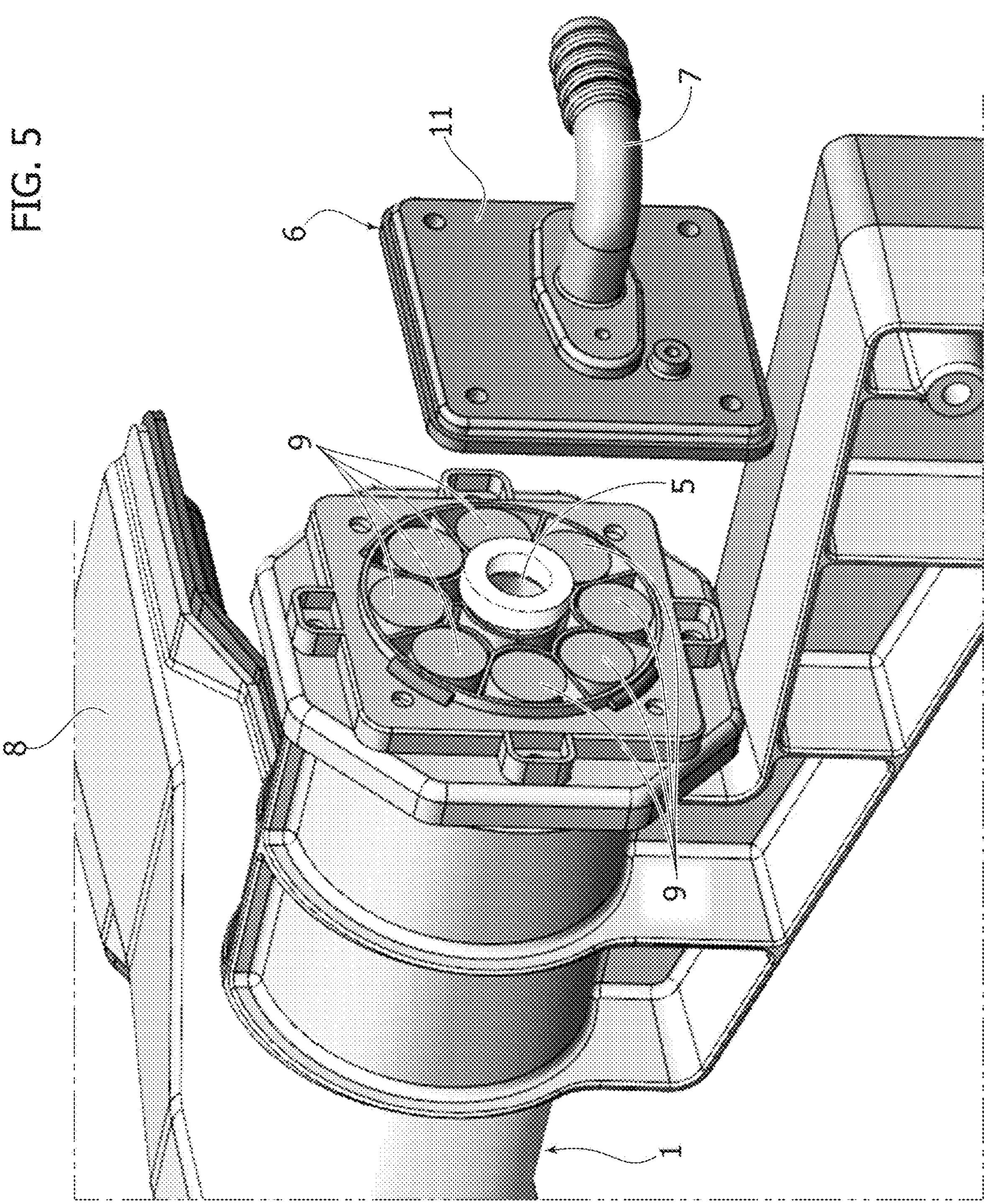
FIG. 5 is an exploded perspective view of some components illustrated in FIG. 4B.

As illustrated in FIGS. 4B-5, at the ends of the cross member 1 there are respective closing elements 6 arranged to close the ends of the cross member 1 and to lock the battery pack 2 in position inside the containment body 4. The closing elements 6 comprise a main wall 11 substantially perpendicular to the axis I of the cross member 1, from which a connecting element 7 extends to achieve the connection with respective ducting elements of an air conditioning system, so as to allow a flow of air within the central axial channel 5.

It should be noted that in the final step of assembling the batteries 9 within the cross member 1, it is necessary to electrically connect the battery pack 2 to an electrical circuit/component of the motor-vehicle (for example, an electronic control unit) in order to be able to recharge the pack 2 batteries, so as to allow the operation of the power supply and recharge functions.

Of course, without prejudice to the principle of the invention, the details of construction and the embodiments may vary with respect to those described and illustrated purely by way of example, without departing from the scope of the present invention, as defined by the attached claims. This applies both to the shape of the cross member and to the configuration of the batteries arranged inside the cross member, as well as to the predisposition of the containment body of the batteries, exploiting the "cartridge" type functionality for containing the batteries.

The invention claimed is:

1. A cross member for supporting a dashboard of a motor-vehicle defining a hollow bearing element having an axial cavity, the cross member comprising:
- a battery pack mounted within said axial cavity of the supporting cross member:
  - a containment body arranged to contain the battery pack, said containment body being mounted inside the cavity of the supporting cross member; and
  - the containment body comprising an axial channel provided for enabling passage of an air flow for cooling the battery pack arranged inside the containment body, said battery pack being arranged radially around the axial channel.

2. The cross member according to claim 1, further comprising respective closing elements at the ends of the cross member, for closing the ends of the cross member and locking in position the battery pack inside the containment body.

3. The cross member according to claim 2, wherein the closing elements comprise at least one connecting element for connecting with respective duct elements of a vehicle air conditioning system, so as to enable passage of an air-flow inside the cavity to cool the battery pack.

4. A motor-vehicle dashboard comprising the supporting cross member according to claim 1.

5. A motor-vehicle comprising the supporting cross member for a dashboard according to claim 1.

6. A method for assembling the cross member of a motor-vehicle dashboard according to claim 1, comprising the following steps:
- providing the battery pack to power an electric or hybrid propulsion system,
- inserting the battery pack inside the axial cavity of the cross member,
- electrically connecting the battery pack to an electrical circuit of the motor-vehicle,
- assembling the dashboard on the cross member.

7. A method according to claim 6, comprising the steps of:
- providing a containment body for containing the battery back,
- arranging the battery pack inside the containment body.

8. A cross member for supporting a dashboard of a motor-vehicle defining a hollow bearing element having an axial cavity, the cross member comprising:
- a battery pack mounted within said axial cavity of the supporting cross member;

respective closing elements at the ends of the cross member, for closing the ends of the cross member and locking in position the battery pack inside the containment body; and the closing elements comprising at least one connecting element for connecting with respective duct elements of a vehicle air conditioning system, so as to enable passage of an air-flow inside the cavity to cool the battery pack.

* * * * *